No. 862,899. PATENTED AUG. 13, 1907.
O. J. GARLOCK.
ROD PACKING.
APPLICATION FILED MAY 1, 1907.

Witnesses
L. L. Armstrong
A. M. Whitmore

Inventor
Olin J. Garlock,
By
E. B. Whitmore,
Attorney

UNITED STATES PATENT OFFICE.

OLIN J. GARLOCK, OF PALMYRA, NEW YORK.

ROD-PACKING.

No. 862,899.     Specification of Letters Patent.     Patented Aug. 13, 1907.

Application filed May 1, 1907. Serial No. 371,306.

*To all whom it may concern:*

Be it known that I, OLIN J. GARLOCK, of Palmyra, in the county of Wayne and State of New York, have invented a new and useful Improvement in Rod-Packings, which improvement is fully set forth in the following specification and shown in the accompanying drawings.

This invention relates to certain new and useful improvements in rod packing designed more particularly for packing piston rods, such for instance as in hydraulic pumps where the rods are of ordinary medium diameters.

The present invention has for its objects among others to provide a rubber-back packing having a fibrous part for contact with the rod, this fibrous part being preferably a braided flax, and the rubber applied while in a liquid or semi fluid state when the packing is being constructed, and then by pressure while in the mold and heated the rubber is forced against the fibrous part so as to thoroughly and completely fill all of the interstitial spaces between the strands of the braid and firmly uniting with the same so as to make the whole a homogeneous, concrete, unitary article.

Other objects and advantages of the invention will hereinafter appear, and the novel features thereof will be particularly pointed out in the appended claims.

Figure 1:
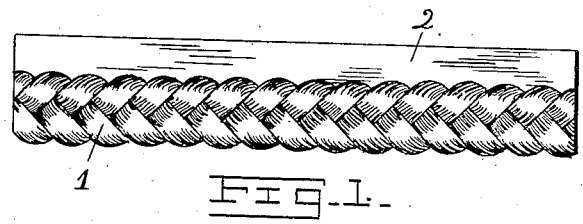
Figure 2:
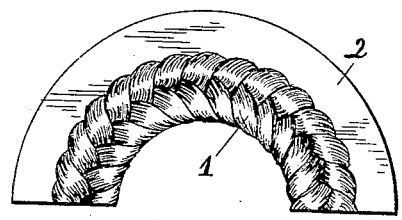
Figure 3:
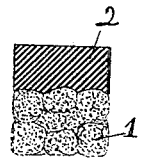
Figure 4:
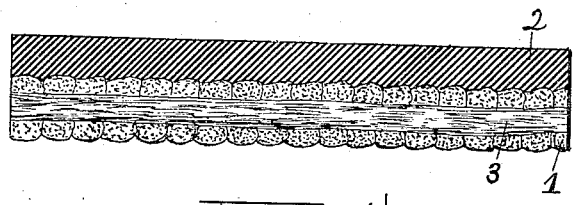

The invention is clearly illustrated in the accompanying drawing, which, with the numerals of reference marked thereon, form a part of this specification and in which Figure 1 is an elevation of a strip of packing embodying my present invention. Fig. 2 is a similar view of one-half of a packing ring formed of such strip. Fig. 3 is a cross section through the strip seen in Fig. 1. Fig. 4 is a substantially central longitudinal section through the strip seen in Fig. 1.

Like numerals of reference indicate like parts throughout the several views.

In carrying out my invention I take a fibrous member 1, preferably of braided flax and place it in a mold, the strip being usually about twelve feet in length, and then there is turned into the mold on top of this braid, rubber in a liquid or semi fluid state, the rubber flowing into the insterstices between the adjacent strands of the braid. The whole is then subjected to pressure in the mold, and all subjected to heat to cure the rubber and vulcanize it, the rubber at the same time being forced into the flax braid and firmly uniting therewith so that the whole is made a homogeneous, concrete and unitary strip of packing material. The rubber facing is indicated in the drawing by the reference numeral 2.

The packing is made in long ropes or strips to be cut into such lengths as may be needed for use in packing rods of different diameters. The pieces may be bent into rings to encircle the rod, as will be clearly understood from Fig. 2, the fibrous part 1 being on the concave side, or next to the rod. The ends of the strip when thus bent into ring form abut squarely together as will be evident. The fibrous portion 1 may be of any suitable form of braid; in Fig. 4 I have shown it as formed of strands braided about a central longitudinal strand 3, but it is evident that this portion 1 of my improved packing ring may be of any suitable character of braided fibrous material. The braided member 1 is preferably of less thickness than width so as to leave space for the rubber, in order that the completed strip shall be substantially square in cross section as seen in Fig. 3. By preference, the rubber should be of such quality as to serve efficiently for both steam and cold water packing.

The packing may be placed on the market in ring, spiral, or in coil form.

What is claimed as new is:

1. The method of forming rod packing which consists in applying liquid rubber to a braided fibrous member and then while in a heated condition compressing the rubber upon and into the interstices of the braided member.

2. A rod packing composed of a member of braided fibrous material, braided about a central longitudinal strand, and an outer member of rubber molded thereinto.

In witness whereof, I have hereunto set my hand this 27th day of April, 1907, in the presence of two subscribing witnesses.

OLIN J. GARLOCK.

Witnesses:
   G. E. BERNHARD,
   FRANK P. HEINEMAN.